US012755114B2

(12) United States Patent
Ishikawa et al.

(10) Patent No.: US 12,755,114 B2
(45) Date of Patent: Oct. 6, 2026

(54) WIRELESS TAG COMMUNICATION APPARATUS AND WIRELESS TAG COMMUNICATION METHOD

(71) Applicant: Toshiba Tec Kabushiki Kaisha, Tokyo (JP)

(72) Inventors: Hiroyuki Ishikawa, Sunto Shizuoka (JP); Nanami Shinozaki, Sunto Shizuoka (JP); Sadatoshi Oishi, Fuji Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 19/202,490

(22) Filed: May 8, 2025

(65) Prior Publication Data

US 2026/0073167 A1 Mar. 12, 2026

(30) Foreign Application Priority Data

Sep. 9, 2024 (JP) ................................ 2024-154900

(51) Int. Cl.
*G06K 7/10* (2006.01)

(52) U.S. Cl.
CPC ................................ *G06K 7/10366* (2013.01)

(58) Field of Classification Search
CPC .................................................. G06K 7/10366
USPC .......................................................... 235/451
See application file for complete search history.

(56) References Cited

U.S. PATENT DOCUMENTS

| | | | | |
|---|---|---|---|---|
| 11,003,869 | B2 | 5/2021 | Tomiyama | |
| 12,001,909 | B2 | 6/2024 | Ishikawa | |
| 12,411,203 | B2 | 9/2025 | Ishikawa | |
| 2015/0373663 | A1* | 12/2015 | Bao .................... | G01S 5/02521 455/456.6 |
| 2018/0039801 | A1 | 2/2018 | Suzuki | |
| 2019/0392183 | A1 | 12/2019 | Oishi | |
| 2023/0062536 | A1 | 3/2023 | Ishikawa et al. | |
| 2023/0177290 | A1 | 6/2023 | Ishikawa | |
| 2023/0307827 | A1 | 9/2023 | Nakamura et al. | |
| 2024/0036152 | A1 | 2/2024 | Tomiyama et al. | |
| 2024/0330621 | A1 | 10/2024 | Ishikawa et al. | |
| 2024/0357539 | A1 | 10/2024 | Ishikawa et al. | |
| 2025/0265427 | A1 | 8/2025 | Ishikawa et al. | |

(Continued)

FOREIGN PATENT DOCUMENTS

| | | | |
|---|---|---|---|
| JP | 2024110189 | A | 8/2024 |
| JP | 2024110239 | A | 8/2024 |
| JP | 2024137291 | A | 10/2024 |

(Continued)

*Primary Examiner* — Toan C Ly
(74) *Attorney, Agent, or Firm* — Kim & Stewart LLP

(57) ABSTRACT

In accordance with an embodiment, a wireless tag communication apparatus according to the embodiment receives radio waves transmitted from a wireless tag by an antenna. The wireless tag communication apparatus changes a relative position of the antenna with respect to the wireless tag. The wireless tag communication apparatus reads tag data of the wireless tag at a plurality of relative positions of the antenna with respect to the wireless tag on the basis of the received radio waves and infers an arrangement region of the wireless tag from the tag data. The wireless tag communication apparatus sets a change speed of the relative position of the antenna with respect to the wireless tag.

10 Claims, 14 Drawing Sheets

(56) References Cited

U.S. PATENT DOCUMENTS

| | | | |
|---|---|---|---|
| 2026/0073166 | A1 | 3/2026 | Shinozaki et al. |
| 2026/0073345 | A1 | 3/2026 | Shinozaki et al. |

FOREIGN PATENT DOCUMENTS

| | | | |
|---|---|---|---|
| JP | 2024147288 | A | 10/2024 |
| JP | 2025005072 | A | 1/2025 |
| JP | 2025088964 | A | 6/2025 |
| JP | 2025110232 | A | 7/2025 |
| JP | 2025145689 | A | 10/2025 |

* cited by examiner

WIRELESS TAG COMMUNICATION APPARATUS AND WIRELESS TAG COMMUNICATION METHOD

CROSS-REFERENCE TO RELATED APPLICATIONS

This application is based upon and claims the benefit of priority from the prior Japanese Patent Application No. 2024-154900, filed on Sep. 9, 2024, the entire contents of which are incorporated herein by reference.

FIELD

An embodiment described here generally relates to a wireless tag communication apparatus and a wireless tag communication method.

In recent years, wireless tags have increasingly been used for checkout processing, inspection processing, and the like. In such a system, a user detects one of wireless tags attached to items or commodities and reads information from the wireless tag through a wireless tag communication apparatus. When a wireless tag is irradiated with radio waves from the wireless tag communication apparatus, the wireless tag transmits radio waves in response to the irradiation. The wireless tag communication apparatus emits radio waves from an antenna and receives radio waves transmitted back from a wireless tag through the antenna, thereby detecting the wireless tag and reading information from the wireless tag.

In addition, the wireless tag communication apparatus infers an arrangement region of the wireless tag by transmitting and receiving radio waves while changing a relative position of the antenna with respect to the wireless tag and reading information from the wireless tag at a plurality of relative positions of the antenna with respect to the wireless tag. A method based on a phase difference, which is a change in phase, a method using a model learned by machine learning, or the like is known as a method of inferring the arrangement region of the wireless tag.

In general, anti-collision to avoid communication collisions is employed in the wireless tag communication. If the number of commodities is large, wireless tags will not respond simultaneously due to anti-collision, reducing the amount of data that can be obtained from a wireless tag. Therefore, the accuracy of inference of the arrangement region of the wireless tag decreases.

DETAILED DESCRIPTION

Figure 1:
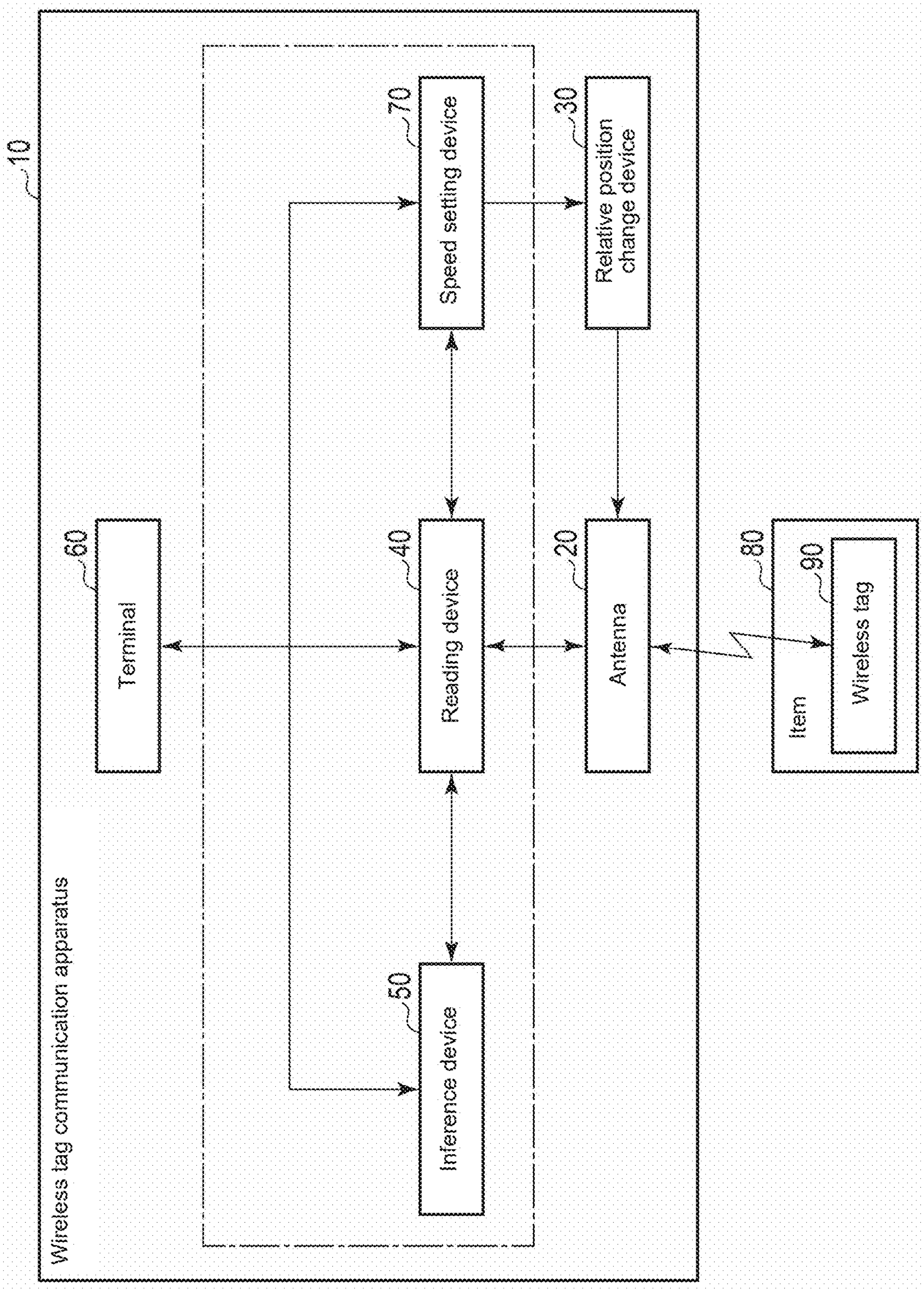
FIG. 1 is a block diagram showing a configuration example of a wireless tag communication apparatus according to an embodiment.

In accordance with wireless tag communication apparatus includes an antenna, a relative position change device, a reading device, an inference device, and a speed setting device. The antenna receives radio waves transmitted from a wireless tag. The relative position change device changes a relative position of the antenna with respect to the wireless tag. The reading device reads tag data of the wireless tag at a plurality of relative positions of the antenna with respect to the wireless tag on the basis of radio waves received by the antenna. The inference device infers an arrangement region of the wireless tag from the tag data. The speed setting device sets a change speed of the relative position of the antenna with respect to the wireless tag.

Hereinafter, an embodiment will be described with reference to the drawings. In each drawing, configuration(s) may be omitted or simplified as appropriate for the sake of description. In the drawings, the same reference signs denote the same or similar portions.

(Wireless Tag Communication Apparatus)

First of all, a wireless tag communication apparatus 10 according to an embodiment will be described with reference to FIG. 1. FIG. 1 is a block diagram showing a configuration example of the wireless tag communication apparatus 10 according to the embodiment.

The wireless tag communication apparatus 10 reads tag data from a wireless tag 90 attached to an item 80 such as a commodity, infers an arrangement region of the wireless tag 90 from the read tag data, and performs processing depending on an application on each wireless tag 90 in the inferred arrangement region.

FIG. 1 shows one item 80 and one wireless tag 90 for the sake of convenience, but this is not intended to limit the number of items 80 and the number of wireless tags 90. There may be one or more items 80 and one or more wireless tags 90. In many cases, there are a plurality of items 80 and a plurality of wireless tags 90. One wireless tag 90 is attached to one item 80.

The wireless tag communication apparatus 10 includes an antenna 20, a relative position change device 30, a reading device 40, an inference device 50, a terminal 60, and a speed setting device 70.

The antenna 20 is a device for communication with the wireless tag 90. The antenna 20 emits radio waves. Moreover, the antenna 20 receives radio waves transmitted from the wireless tag 90 that responds to the irradiation with radio waves. The antenna 20 converts the radio waves received from the wireless tag 90 into a high-frequency signal and outputs the high-frequency signal to the reading device 40.

The relative position change device 30 changes the relative position of the antenna 20 with respect to the wireless tag 90. A configuration example of the relative position change device 30 will be described later.

The reading device 40 controls the antenna 20 and the relative position change device 30 to read the tag data of the wireless tags 90 on the basis of radio waves transmitted from the wireless tag 90 and received by the antenna 20. Specifically, the reading device 40 reads the tag data of the wireless tags 90 at a plurality of relative positions of the antenna 20 with respect to the wireless tag 90.

The inference device 50 infers an arrangement region of the wireless tag 90 from the tag data of the wireless tags 90 at the plurality of relative positions of the antenna 20 with respect to the wireless tag 90 read by the reading device 40. For example, as for one arrangement region, the inference device 50 infers whether the wireless tag 90 is inside or outside that region. The number of arrangement regions is not limited to one. That is, as for each region of a plurality of arrangement regions, the inference device 50 may infer whether the wireless tag 90 is inside or outside that region. The inference device 50 performs inference for example by using a model learned by machine learning or on the basis of a phase difference in received radio waves.

The terminal 60 is a device that is an interface with a user (i.e., a user interface). The terminal 60 receives the user's instruction to the wireless tag communication apparatus 10. The terminal 60 also presents to the user processing results of the wireless tag communication apparatus 10, e.g., a reading result of the reading device 40 and an inference result of the inference device 50.

Moreover, the terminal 60 processes the reading result of the reading device 40 and the inference result of the inference device 50. In an example, the terminal 60 is a checker terminal for checkout processing. In another example, the terminal 60 is a portable terminal used for picking work in inspection processing. Not limited thereto, the terminal 60 may be any terminal that processes the reading result of the reading device 40 and the inference result of the inference device 50 depending on purposes.

The speed setting device 70 controls the relative position change device 30 to set a change speed of the relative position of the antenna 20 with respect to the wireless tag 90 to be an appropriate speed. Here, the appropriate speed refers to a speed at which a sufficient amount of data can be acquired from one wireless tag 90 even in a case where the number of responses of the wireless tags 90 decreases due to anti-collision. Therefore, the speed setting device 70 sets the speed to be lower in a case where the number of wireless tags 90 is larger than in a case where the number of wireless tags 90 is smaller.

The item 80 is for example a commodity displayed at a store for sale, or a commodity stored in a warehouse or another location before shipping or a commodity delivered in distribution. Not limited thereto, the item 80 may be any item managed by using the wireless tag 90.

The wireless tag 90 is for example a radio frequency identification (RFID) tag. Not limited thereto, the wireless tag 90 may be another wireless tag. For example, the wireless tag 90 is a passive-type wireless tag that operates using radio waves transmitted from the antenna 20 as an energy source. The wireless tag 90 performs backscatter modulation on an unmodulated signal, thereby sending a signal including the tag data stored in the wireless tag 90. The tag data stored in the wireless tag 90 includes identification tag data that can be uniquely identified. For example, the tag data stored in the wireless tag 90 includes an identification code of the item 80 with the wireless tag 90 attached.

(Configuration Example of Relative Position Change Device)

Figure 2:
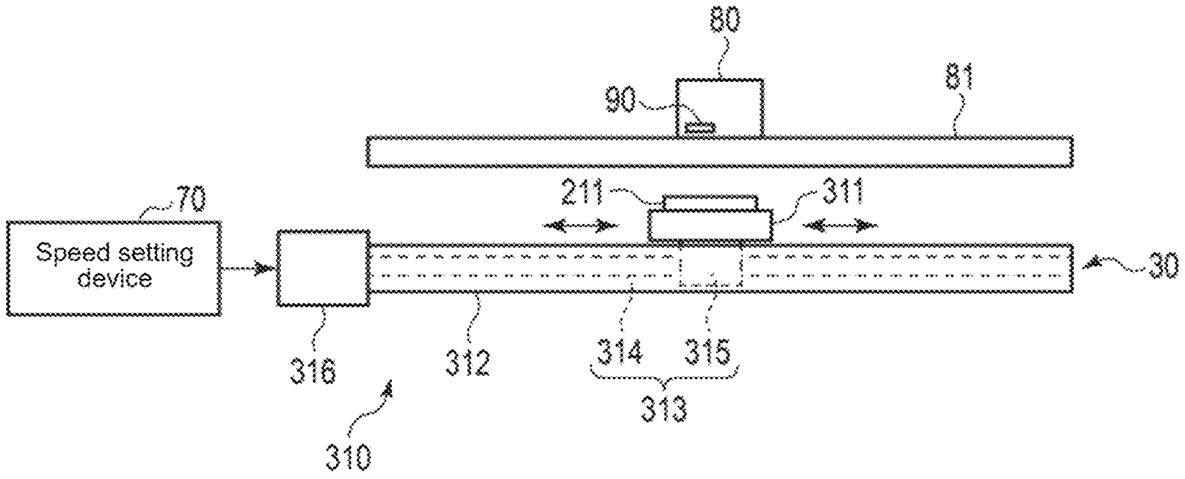
FIG. 2 is a diagram showing a configuration example of a relative position change device shown in FIG. 1.

Next, a configuration example of the relative position change device 30 will be described with reference to FIG. 2. FIG. 2 is a diagram showing the configuration example of the relative position change device 30 of the wireless tag communication apparatus 10.

In the configuration example of the relative position change device 30 shown in FIG. 2, the antenna 20 includes one antenna 211. The antenna 20 is installed under a table 81 on which the item 80 with the wireless tag 90 attached is placed.

The relative position change device 30 includes a moving mechanism 310 that moves the antenna 211. The moving mechanism 310 is a linear moving mechanism that linearly moves the antenna 211. The moving mechanism 310 includes a stage 311, a guide rail 312, and a driving device 316. The stage 311 retains the antenna 211. The guide rail 312 retains the stage 311 so that the stage 311 can move linearly. The guide rail 312 includes a ball screw 313 therein. The ball screw 313 includes a rotatable screw shaft 314 and a nut 315 movable along the screw shaft 314 due to a rotation of the screw shaft 314. The nut 315 retains the stage 311. The driving device 316 rotates the screw shaft 314. The rotary motion of the screw shaft 314 is translated into a linear motion of the nut 315. Therefore, the antenna 211 retained on the stage 311 is linearly moved by rotating the screw shaft 314 through the driving device 316.

The speed setting device 70 controls the driving device 316. The driving device 316 is for example a stepper motor. The speed setting device 70 sets r.p.m. of the stepper motor, which is the driving device 316, thereby setting a change speed of the relative position of the antenna 211 with respect to the wireless tag 90, i.e., a linear motion speed, to be an appropriate speed.

(Another Configuration Example of Relative Position Change Device)

Figure 3:
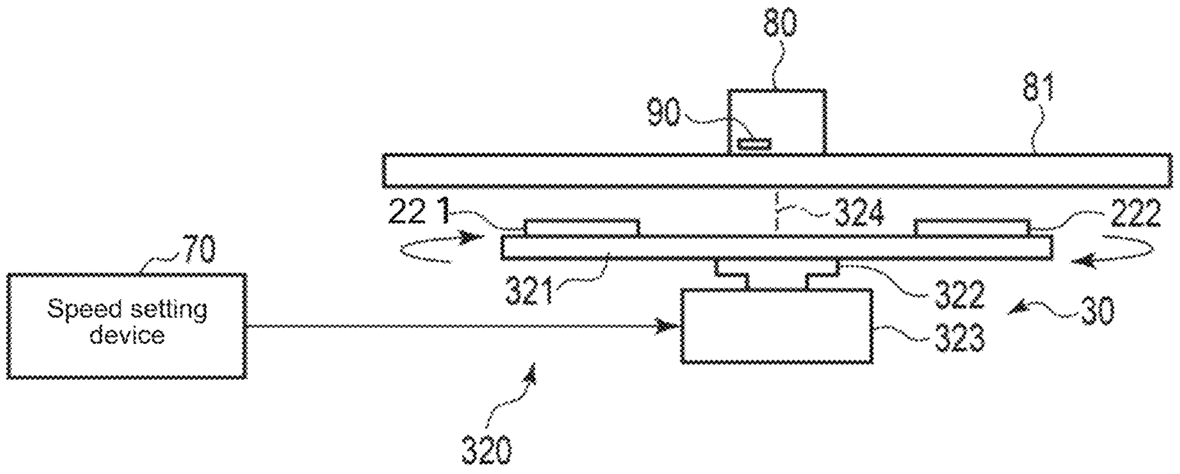
FIG. 3 is a diagram showing another configuration example of the relative position change device shown in FIG. 1.

Next, another configuration example of relative position change device 30 will be described with reference to FIG. 3. FIG. 3 is a diagram showing the other configuration example of the relative position change device 30 of the wireless tag communication apparatus 10.

In the configuration example of the relative position change device 30 shown in FIG. 3, the antenna 20 includes two antennas 221 and 222. The antennas 221 and 222 are installed under the table 81 on which the item 80 with the wireless tag 90 attached is placed.

The relative position change device 30 includes a moving mechanism 320 that moves the antennas 221 and 222. The moving mechanism 320 is a rotating mechanism that rotates the antennas 221 and 222 around a rotating center axis 324. The moving mechanism 320 includes a stage 321, a retaining unit 322, and a driving device 323. The stage 321 retains the antennas 221 and 222. The retaining unit 322 rotatably retains the stage 321. The driving device 323 rotates the retaining unit 322 around the rotating center axis 324. Therefore, the antennas 221 and 222 retained on the stage 321 are rotated around the rotating center axis 324 by rotating the retaining unit 322 retaining the stage 321 through the driving device 323.

The speed setting device 70 controls the driving device 323. The driving device 323 is for example a stepper motor. The speed setting device 70 sets r.p.m. of the stepper motor, which is the driving device 323, thereby setting a change speed of the relative positions of the antennas 221 and 222 with respect to the wireless tag 90, i.e., a rotary motion speed, to be an appropriate speed.

(Yet Another Configuration Example of Relative Position Change Device)

Figure 4:
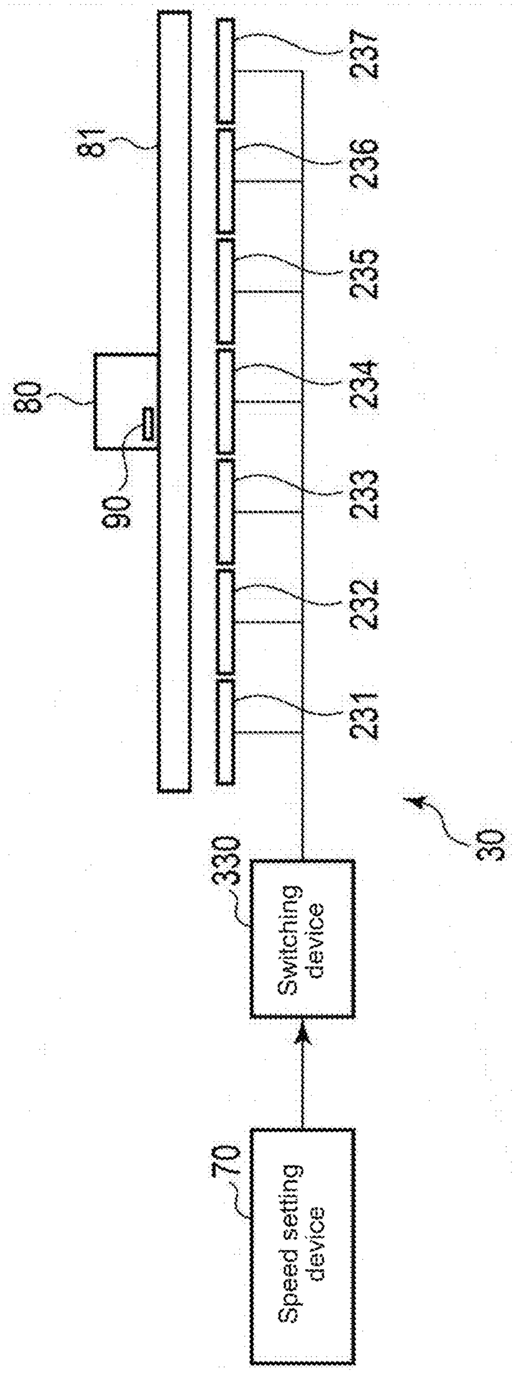
FIG. 4 is a diagram showing yet another configuration example of the relative position change device shown in FIG. 1.

Next, yet another configuration example of the relative position change device 30 with reference to FIG. 4 will be described. FIG. 4 is a diagram showing the other configuration example of the relative position change device 30 of the wireless tag communication apparatus 10.

In the configuration example of the relative position change device 30 shown in FIG. 4, the antenna 20 includes a plurality of antennas, e.g., seven antennas 231 to 237. The antennas 231 to 237 is installed under the table 81 on which the item 80 with the wireless tag 90 attached is placed. The number of antennas 231 to 237 is not limited thereto, and a plurality of antennas only needs to be employed as the antennas 231 to 237. Favorably, the number of antennas 231 to 237 is as large as possible.

The relative position change device 30 includes a switching device 330 that switches the antennas 231 to 237. For example, the switching device 330 switches on/off the sending and receiving functions of the antennas 231 to 237. That is, the switching device 330 transmits and receives radio waves by using any antenna of the antennas 231 to 237.

The speed setting device 70 controls the switching device 330. For example, the speed setting device 70 controls the switching device 330 to transmit and receive radio waves by using one antenna of the antennas 231 to 237 at a time and to switch the antenna to transmit and receive radio waves over time. For example, the speed setting device 70 controls the switching device 330 to switch the antenna to transmit and receive radio waves along the arranged antennas 231 to 237. The speed setting device 70 sets the time intervals of switching the antenna to transmit and receive radio waves, thereby setting a change speed of the relative positions of the antenna 231 to 237 with respect to the wireless tag 90, i.e., a switching speed to be an appropriate speed.

(Hardware Configuration)

For example, a computer constitutes the reading device 40, the inference device 50, the terminal 60, and the speed setting device 70 of the wireless tag communication apparatus 10. The computer includes for example a personal computer, a server computer, and a tablet.

In an example, one computer constitutes the reading device 40, the inference device 50, the terminal 60, and the speed setting device 70. One computer may constitute each of the reading device 40, the inference device 50, the terminal 60, and the speed setting device 70. For example, one computer may constitute the terminal 60 and wirelessly communicate with other computers that constitute the reading device 40, the inference device 50, and the speed setting device 70.

Figure 5:
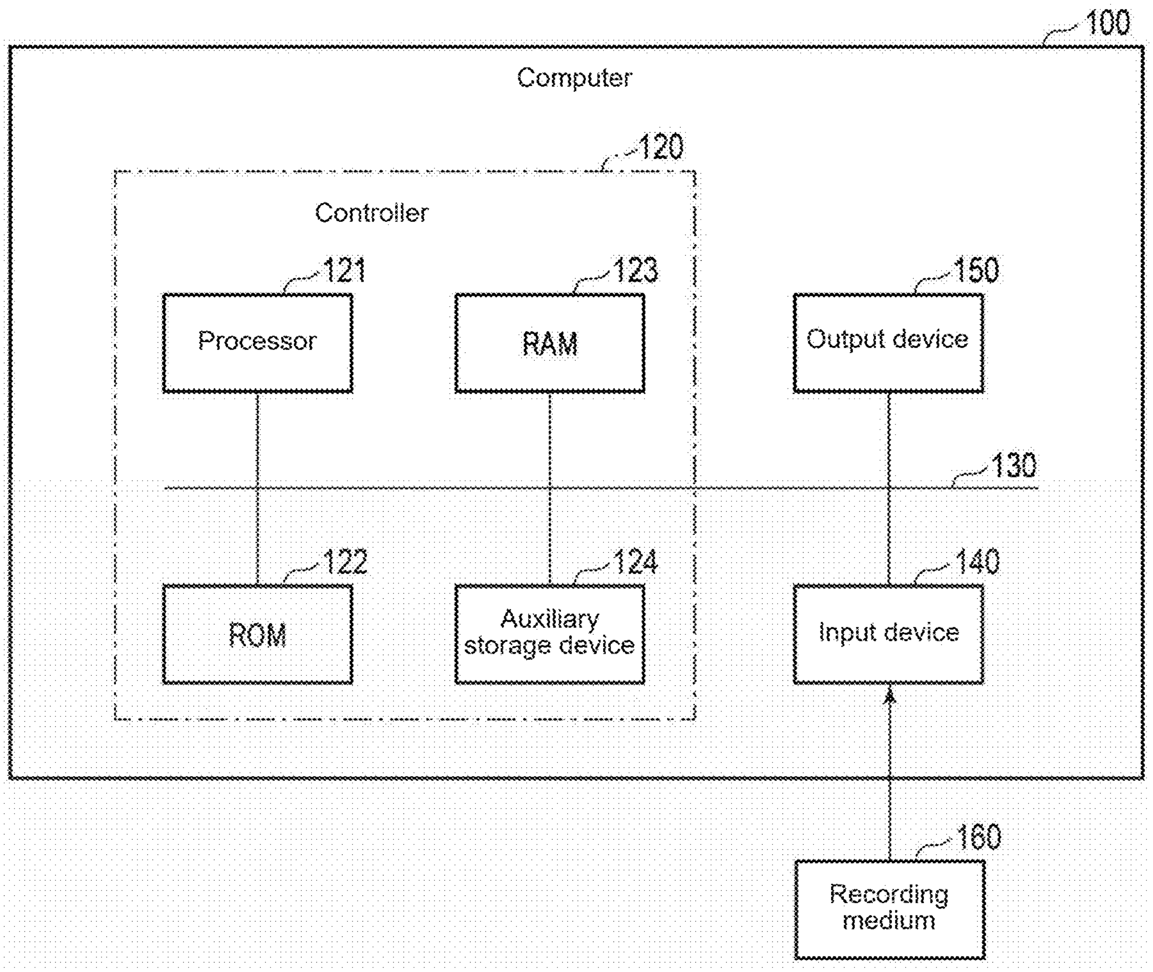
FIG. 5 is a diagram showing a hardware configuration of a computer that constitutes a reading device, an inference device, the relative position change device, and a terminal shown in FIG. 1.

Hereinafter, a hardware configuration example of a computer 100 that constitutes the reading device 40, the inference device 50, the terminal 60, and the speed setting device 70 will be described with reference to FIG. 5. FIG. 5 is a block diagram showing the hardware configuration example of the computer 100 that constitutes the reading device 40, the inference device 50, the terminal 60, and the speed setting device 70.

The computer 100 includes a controller 120, an input device 140, and an output device 150.

The controller 120 comprehensively controls the computer 100. The controller 120 includes a processor 121, a read only memory (ROM) 122, a random access memory (RAM) 123, and an auxiliary storage device 124.

The processor 121, the ROM 122, the RAM 123, the auxiliary storage device 124, the input device 140, and the output device 150 are electrically connected to one another via a bus 130, and are capable of exchanging data.

The processor 121 is constituted by a universal hardware processor including for example a central processing unit (CPU) and a graphical processing unit (GPU). The processor 121 performs various functions of the computer 100 by executing a program deployed in the RAM 123.

The ROM 122 is a nonvolatile memory that forms a part of a main storage device. The ROM 122 stores a startup program necessary for starting the computer 100 in a non-transitory manner. The processor 121 starts the computer 100 by deploying and executing the startup program stored in the ROM 122, in the RAM 123. The ROM 122 is constituted by for example an erasable programmable read only memory (EPROM) and is capable of storing some settings for the startup as well as the startup program.

The RAM 123 is a volatile memory that forms a part of a main storage device. The RAM 123 temporarily stores a program necessary for the processing of the processor 121 and data necessary for executing the program. That is, the RAM 123 functions as a working area of the processor 121.

The auxiliary storage device 124 is constituted by a nonvolatile memory such as a hard disk drive (HDD) or a solid state drive (SSD). The auxiliary storage device 124 is capable of storing various programs, which are executed by the processor 121, and data necessary for executing the programs in a non-transitory manner. The processor 121 performs various functions of the computer 100 by deploying and executing the program stored in the auxiliary storage device 124, in the RAM 123.

The input device 140 is a device for the user to input information and an instruction and receives inputs of the information and instruction. The input device 140 includes a keyboard, a pointing device, and the like. The pointing device includes a mouse, a truck pad, a touch screen, and the like. The input device 140 further includes a sensor. The sensor includes a position sensor, a camera, and the like. For example, in a case where the relative position change device 30 has the configuration example shown in FIGS. 2 and 3, the position sensor includes a home position sensor that detects that the antennas 211, 221, and 222 are located at initial positions (home positions).

The output device 150 is a device that outputs information to provide the information to the user. The output device 150 is for example a display device and displays letters, images, and the like on a screen. The output device 150 is for example a liquid-crystal display, an organic EL display, or a plasma display. Alternatively, the output device 150 is for example an audio output device and includes a loudspeaker that outputs sounds and the like. Alternatively, the output device 150 is for example a light-emitting apparatus that notifies of an abnormality by light, and includes various types of light-emitting elements such as LEDs.

The input device 140 and the output device 150 may be constituted by an input and output device with both functions. Such an input and output device can be constituted by for example a touch panel display.

Moreover, the input device 140 can also include a device that takes information and data from an external device. For example, the input device 140 can include a wired or wireless interface and a receiving device.

Moreover, the output device 150 can also include a device that outputs information and data to the external device. For example, the output device 150 can include a wired or wireless interface and a transmission device.

Moreover, the input device 140 can also include a device that loads data, e.g., a program, from a computer-readable recording medium 160 that has recorded the data in a non-transitory manner. For example, the recording medium 160 includes a disk such as a flexible disk, an optical disc (e.g., CD-ROM, CD-R, DVD-ROM, or DVD-R), or a magneto-optical disk (e.g., MO), and a semiconductor memory. The input device 140 includes their drives, readers, and the like.

The program stored in the auxiliary storage device 124 is provided to the computer 100 for example via the recording medium 160. Moreover, the program may be stored in a server in a network and provided to the computer 100 by being downloaded.

For example, the processor 121 executes the startup program stored in the ROM 122 and starts an operating system (OS) at the time of starting the computer 100. Under the control of the OS, the processor 121 monitors instruction inputs, connections of external devices, and the like. Moreover, under the control of the OS, the processor 121 sets a program area and a data area in the RAM 123.

With respect to an instruction input to activate the program, the processor 121 loads that program to the program area of the RAM 123 from the auxiliary storage device 124 and loads data necessary for executing that program to the data area of the RAM 123 from the auxiliary storage device 124. In accordance with that program, the processor 121 performs an arithmetic operation on the data of the data area and writes an arithmetic operation result in the data area.

By such an operation, the processor 121, the RAM 123, and the auxiliary storage device 124 cooperate to perform at least some functions of the controller 120. Moreover, the controller 120, the input device 140, and the output device 150 cooperate to perform at least some functions of the computer 100.

The program stored in the auxiliary storage device 124 in a non-transitory manner includes a program that causes the processor 121 to perform at least some functions of the controller 120. In other words, the processor 121 performs at least some functions of the controller 120 by executing this program.

For example, the program stored in the auxiliary storage device 124 in a non-transitory manner includes a wireless tag communication program that causes the computer 100 to perform at least some functions of the reading device 40, the inference device 50, the terminal 60, and the speed setting device 70 of the wireless tag communication apparatus 10. By the processor 121 executing the wireless tag communication program, the controller 120 cooperates with the input device 140 and the output device 150 to perform at least some functions of the reading device 40, the inference device 50, the terminal 60, and the speed setting device 70 of the wireless tag communication apparatus 10.

(Operation Example of Wireless Tag Communication Apparatus)

Figure 6:
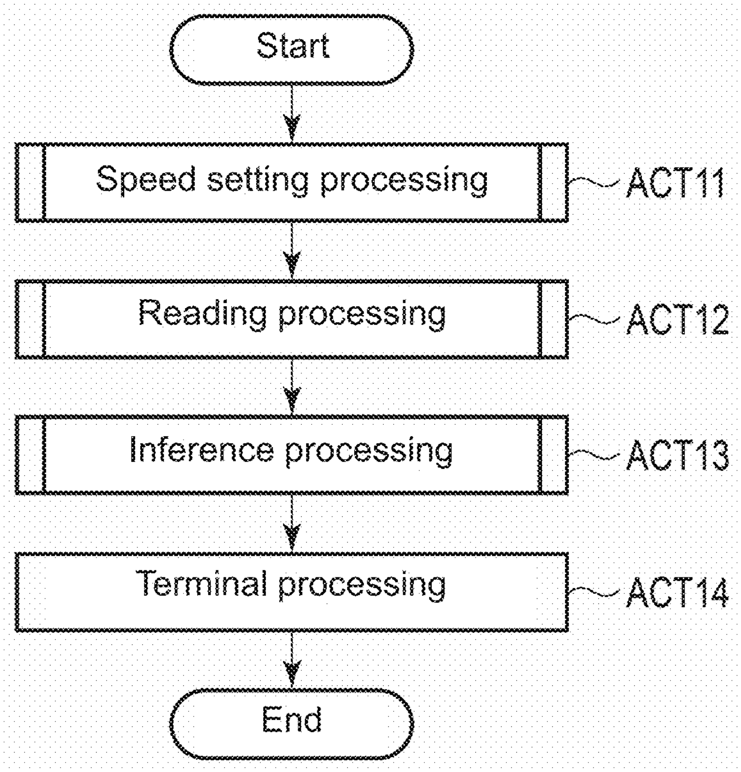
FIG. 6 is a flowchart showing an operation example of the wireless tag communication apparatus according to the embodiment.

Next, an operation example of the wireless tag communication apparatus 10 will be described with reference to FIG. 6. FIG. 6 is a flowchart showing an operation example of the wireless tag communication apparatus 10. The flowchart shown in FIG. 6 is started by for example inputting an operation start instruction in the terminal 60.

In ACT 11, the speed setting device 70 performs speed setting processing before reading the wireless tag 90 by the reading device 40. The speed setting device 70 controls the relative position change device 30 to set the change speed of the relative position of the antenna 20 with respect to the wireless tag 90. A method of setting the change speed of the relative position will be described later. The relative position change device 30 changes the relative position of the antenna 20 with respect to the wireless tag 90 at a speed set by the speed setting device 70.

In ACT 12, the reading device 40 performs reading processing. The reading device 40 reads tag data from the wireless tag 90 while the relative position change device 30 changes the relative position of the antenna 20 with respect to the wireless tag 90. Accordingly, the reading device 40 reads the tag data of the wireless tags 90 at the plurality of relative positions of the antenna 20 with respect to the wireless tag 90. The reading device 40 sends the read tag data of the wireless tags 90 to the inference device 50.

In ACT 13, the inference device 50 performs inference processing. The inference device 50 infers an arrangement region of each wireless tag 90 from the tag data of the wireless tags 90 read by the reading device 40. For example, the inference device 50 infers whether each wireless tag 90 is inside or outside the arrangement region. The inference method will be described later. The inference device 50 sends an inference result to the terminal 60.

In ACT 14, terminal 60 performs terminal the processing. For example, the terminal 60 reads out and displays commodity code and the like of the tag data of the wireless tags 90 inferred by the inference device 50 to be inside the arrangement region. For example, in a case where the terminal 60 is a checker terminal, the terminal 60 reads out price data and the like in addition to the commodity code and performs checkout processing and the like. Moreover, in a case where the terminal 60 is a terminal for picking work, the terminal 60 performs matching processing and the like with a delivery schedule list and a shipment schedule list.

(Operation Example of Speed Setting Processing)

Figure 7:
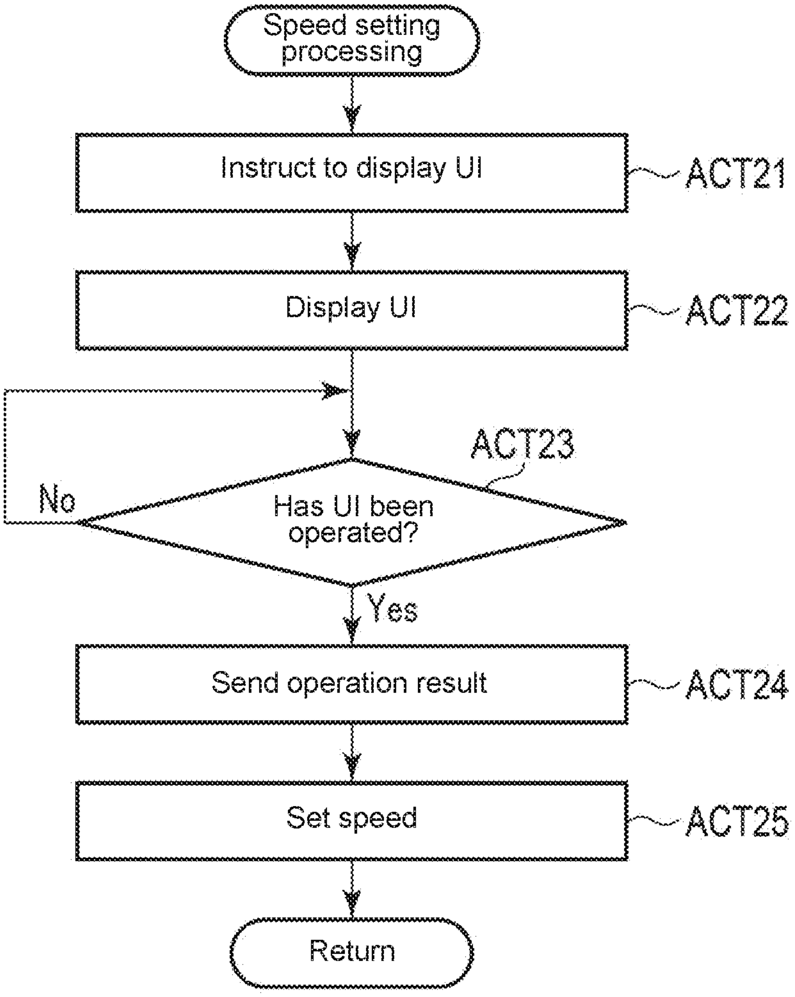
FIG. 7 is a flowchart showing an operation example of speed setting processing shown in FIG. 6.
Figure 8:
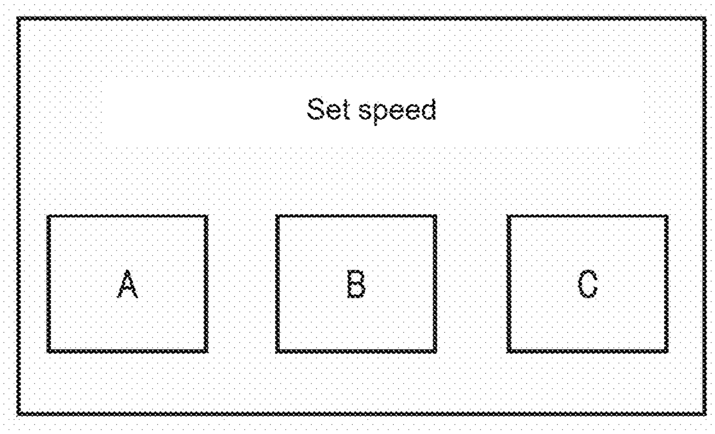
FIG. 8 is a diagram showing an example of a user interface screen displayed in speed setting processing shown in FIG. 7.

Next, an operation example of the speed setting processing by the speed setting device 70 will be described with reference to FIGS. 7 and 8. This operation example is an example in which a user interface (UI) screen is presented to the user and the change speed of the relative position is set in accordance with an operation on the UI screen. FIG. 7 is a flowchart showing this operation example of the speed setting processing. FIG. 8 is a diagram showing an example of the UI screen displayed in the speed setting processing.

In ACT 21, the speed setting device 70 instructs the terminal 60 to display the UI screen for speed setting.

In ACT 22, the terminal 60 displays the UI screen for speed setting. In ACT 23, the terminal 60 stands by until the user performs an operation on the UI screen.

An example of the UI screen displayed on the terminal 60 is shown in FIG. 8. For example, the UI screen shown in FIG. 8 displays icons A, B, and C for options of three speeds. The user is able to select a speed corresponding to the icon A, B, or C by clicking any one of the icons A, B, or C. For example, assuming that the speeds corresponding to the icons A, B, and C are Va, Vb, and Vc, respectively, Va>Vb>Vc is established.

The UI screen shown in FIG. 8 is merely an example. The number of icons is not limited to three. The number of icons may be two or may be four or more.

The terminal 60 continuously waits for an operation while no operation is performed on the UI screen (during the period in No in ACT 23).

When an operation is performed on the UI screen (in the case of Yes in ACT 23), the terminal 60 sends an operation result on the UI screen to the speed setting device 70 in ACT 24.

In ACT 25, the speed setting device 70 sets a setting speed of the relative position change device 30 to be a speed corresponding to the operation result on the UI screen. That is, the speed setting device 70 controls the relative position change device 30 so that the relative position of the antenna 20 with respect to the wireless tag 90 is changed at the speed corresponding to the operation result on the UI screen.

In this operation example, the user selects the change speed of the relative position of the antenna 20 with respect to the wireless tag 90 by the relative position change device 30. Favorably, the user selects a high speed in a case where the number of wireless tags 90 is smaller and selects a low speed in a case where the number of wireless tags 90 is larger. Moreover, in picking work in which the number of wireless tags 90 gradually increases, the user selects a high speed at the start of the work and switches to a low speed along with a progress of the work.

(Another Operation Example of Speed Setting Processing)

Figure 9:
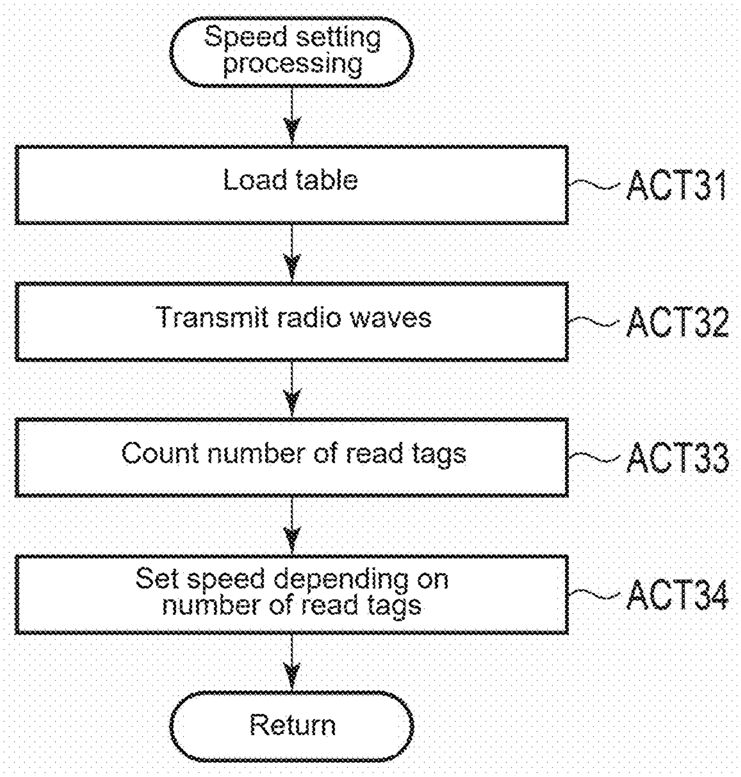
FIG. 9 is a flowchart showing another operation example of the speed setting processing shown in FIG. 6.

Next, another operation example of the speed setting processing by the speed setting device 70 will be described with reference to FIG. 9. This operation example is an example of setting the change speed of the relative position in accordance with the number of read tags of the wireless tags 90. FIG. 9 is a flowchart showing this operation example of the speed setting processing.

In ACT 31, the speed setting device 70 loads a change speed table indicating a relationship between the number of read tags of the wireless tags 90 and the change speed. For example, the change speed table records a plurality of ranges of the number of read tags of the wireless tags 90 and a speed for each range. In the change speed table, a speed for a range in which the number of read tags of the wireless tags 90 is smaller is a higher speed and a speed for a range in which the number of read tags of the wireless tags 90 is larger is a lower speed.

In ACT 32, the reading device 40 transmits radio waves via the antenna 20 and receives radio waves transmitted from the wireless tag 90 that responds to the transmitted radio waves. The reading device 40 sends a receiving result to the speed setting device 70.

In ACT 33, the speed setting device 70 counts the number of read tags of the wireless tags 90 from the receiving result.

Subsequently, in ACT 34, the speed setting device 70 sets the setting speed of the relative position change device 30 to be a speed depending on the number of read tags of the wireless tags 90. Specifically, the speed setting device 70 refers to the change speed table, determines a range including the number of read tags of the wireless tags 90, and sets a speed for the range as the setting speed of the relative position change device 30.

In this operation example, the speed setting device 70 sets the change speed of the relative position of the antenna 20 with respect to the wireless tag 90 by the relative position change device 30 in accordance with the number of read tags of the wireless tags 90. Moreover, the speed setting device 70 sets the change speed of the relative position of the antenna 20 to be an appropriate higher speed in a case where the number of wireless tags 90 is smaller, and sets the change speed to be an appropriate lower speed in a case where the number of wireless tags 90 is larger. For example, the speed setting device 70 sets the change speed of the relative position of the antenna 20 to be a second change speed, which is lower speed than a first change speed when the number of read tags of the wireless tags is a first number, when the number of read tags of the wireless tags is a second number larger than the first number. Moreover, in picking work, the speed setting device 70 sets the change speed of the relative position of the antenna 20 to be an appropriate speed every time the wireless tag 90 is read. For example, the speed setting device 70 sets the current change speed to be a change speed, which is a speed lower than the previous change speed.

(Yet Another Operation Example of Speed Setting Processing)

Figure 10:
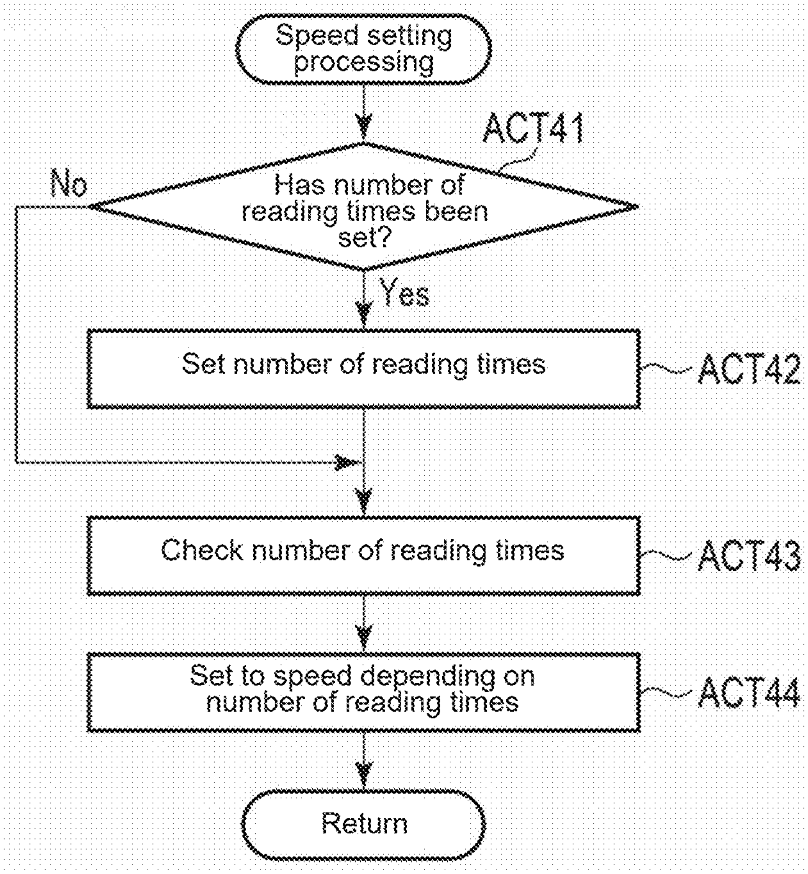
FIG. 10 is a flowchart showing yet another operation example of the speed setting processing shown in FIG. 6.
Figure 11:
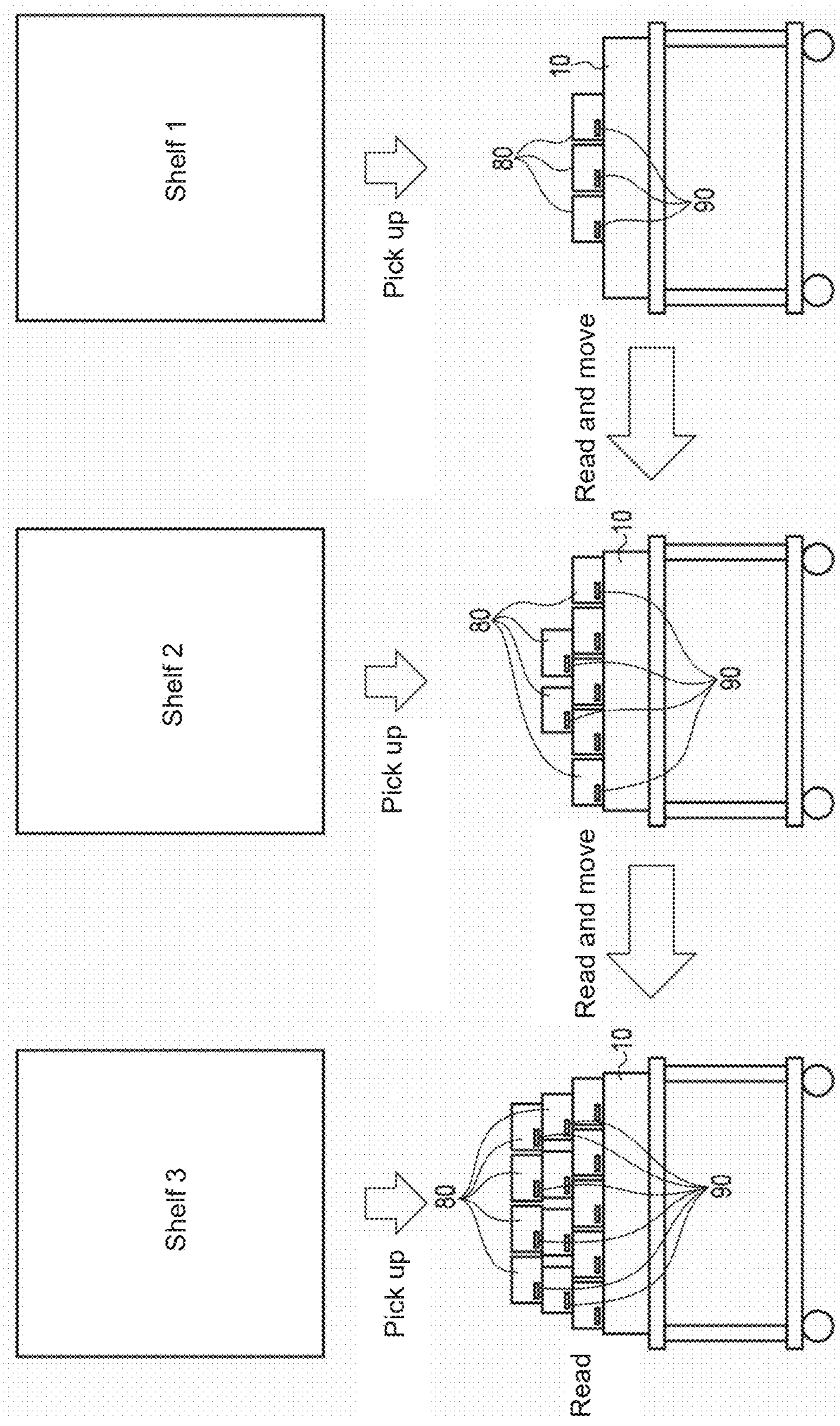
FIG. 11 is a diagram schematically showing an example of picking work to which the speed setting processing shown in FIG. 10 is applied.

Next, yet another operation example of the speed setting processing by the speed setting device 70 will be described with reference to FIGS. 10 and 11. This operation example is an example of setting the change speed of the relative position at the time of reading every time a process in picking work is finished. Moreover, it is an example in which the number of reading times in the picking work is previously set. FIG. 10 is a flowchart showing this operation example of the speed setting processing. FIG. 11 is a diagram schematically showing an example of the picking work.

In ACT 41, the speed setting device 70 determines whether the number of reading times has been set. In a case where the number of reading times has not been set (No in ACT 41), the processing proceeds to processing of setting the number of reading times in ACT 42 and the processing skips the processing of setting the number of reading times in ACT 42 in a case where the number of reading times has been set (Yes in ACT 41). Then, the processing proceeds to the processing of checking the number of reading times in ACT 43.

In a case where the number of reading times has not been set (No in ACT 41), the processing of setting the number of reading times is performed in ACT 42. The processing of setting the number of reading times is performed in such a manner that a UI screen for setting the number of reading times is displayed on for example the terminal 60, and the user performs an input operation for the number of reading times on the UI screen.

In an example of the picking work shown in FIG. 11, the user takes commodities out of a shelf 1, puts the commodities on the wireless tag communication apparatus 10, reads the commodities, and moves the commodities on a shelf 2. Subsequently, the user takes commodities out of the shelf 2, puts the commodities on the wireless tag communication apparatus 10, reads the commodities, and moves the commodities on a shelf 3. Subsequently, the user takes commodities out of the shelf 3, puts the commodities on the wireless tag communication apparatus 10, and reads the commodities. In this case, the number of reading times is 3.

The terminal 60 sends information about the number of reading times to the speed setting device 70 when receiving the user's input operation about the number of reading times on the UI screen. When receives the information about the number of reading times, the speed setting device 70 checks the number of reading times in ACT 43 and sets the change speed of the relative position of the antenna 20 with respect to the wireless tag 90 to be a speed depending on the number of reading times in ACT 44.

For example, assuming that the change speed in the first reading is V1, the change speed in the first reading is the second reading is V2, and the change speed in the third reading is the second reading is V3, the speed setting device 70 sets the change speed of V1>V2>V3.

(Operation Example of Reading Processing)

Figure 12:
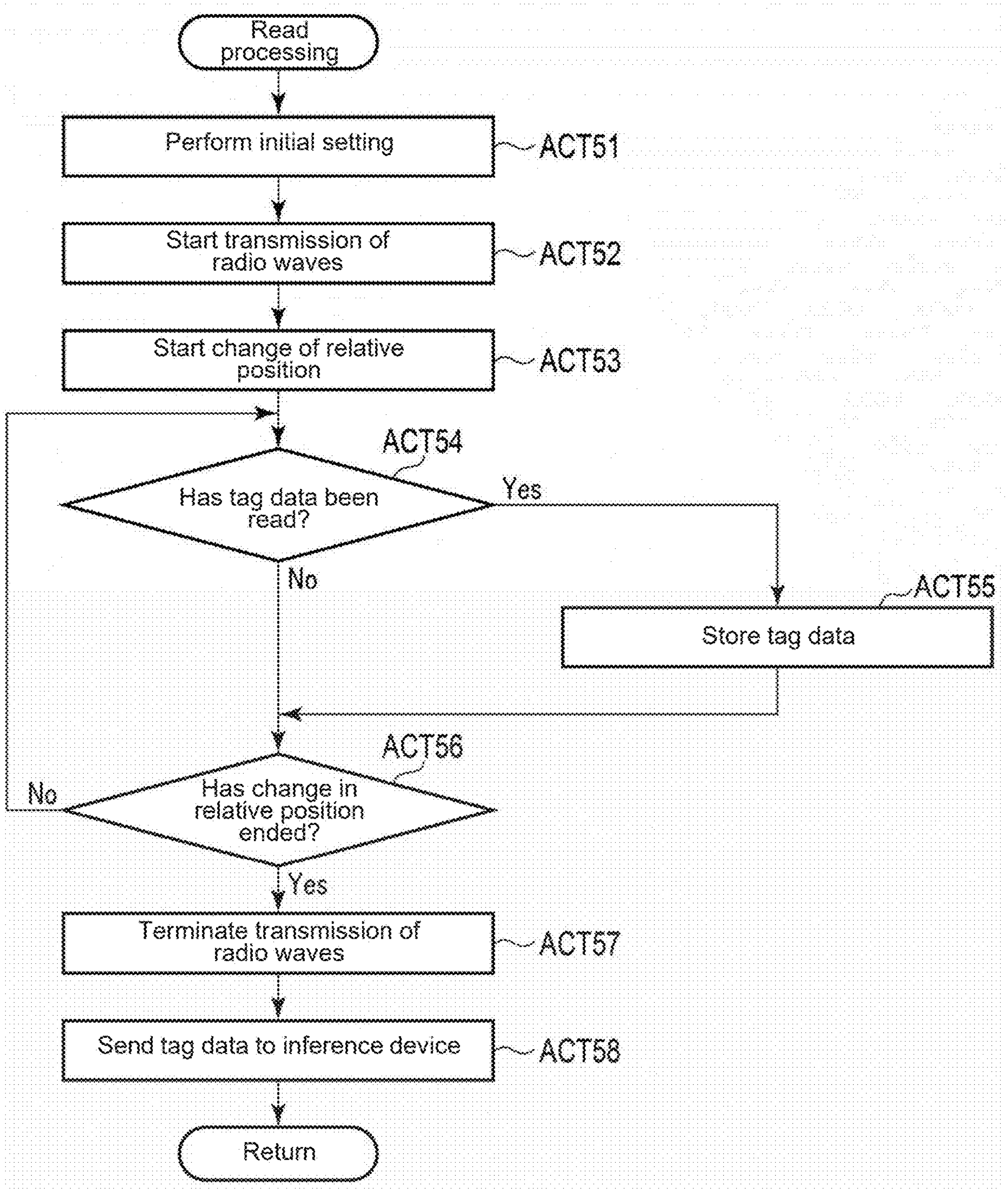
FIG. 12 is a flowchart showing an operation example of reading processing shown in FIG. 6.

Next, an operation example of reading processing by the reading device 40 will be described with reference to FIG. 12. FIG. 12 is a flowchart showing an operation example of the reading processing by the reading device 40.

First of all, the reading device 40 performs processing of initial setting if necessary in ACT 51. For example, the processing of initial setting includes processing of arranging the antennas 211, 221, and 222 at initial positions in a configuration example in which the relative position change device 30 includes for example the moving mechanism 310 that moves the antenna 211 as shown in FIG. 2 and the moving mechanism 320 that moves the antennas 221 and 222 as shown in FIG. 3.

Next, in ACT 52, the reading device 40 starts transmitting radio waves via the antenna 20 and the relative position change device 30 changes, in ACT 53, the relative position of the antenna 20 with respect to the wireless tag 90 at the change speed set by the speed setting device 70.

In ACT 54, in a case where the reading device 40 has read the tag data of the wireless tags 90 (Yes in ACT 54), the reading device 40 stores the read tag data of the wireless tags 90 in ACT 55.

After the tag data is stored in a case where the reading device 40 has read the tag data of the wireless tags 90 (Yes in ACT 54), or in a case where the reading device 40 has not read the tag data of the wireless tags 90 (No in ACT 54), in ACT 56, the relative position change device 30 determines whether or not the change of the relative position of the antenna 20 with respect to the wireless tag 90 ends, and the reading device 40 repeatedly performs the processing of ACT 54 and ACT 55 until the change of the relative position of the antenna 20 with respect to the wireless tag 90 ends (during the period in No in ACT 56).

When the change of the relative position of the antenna 20 with respect to the wireless tag 90 ends (Yes in ACT 56), the reading device 40 terminates the transmission of radio waves in ACT 57 and sends the read tag data to the inference device 50 in ACT 58.

(Operation Example of Inference Processing)

Figure 13:
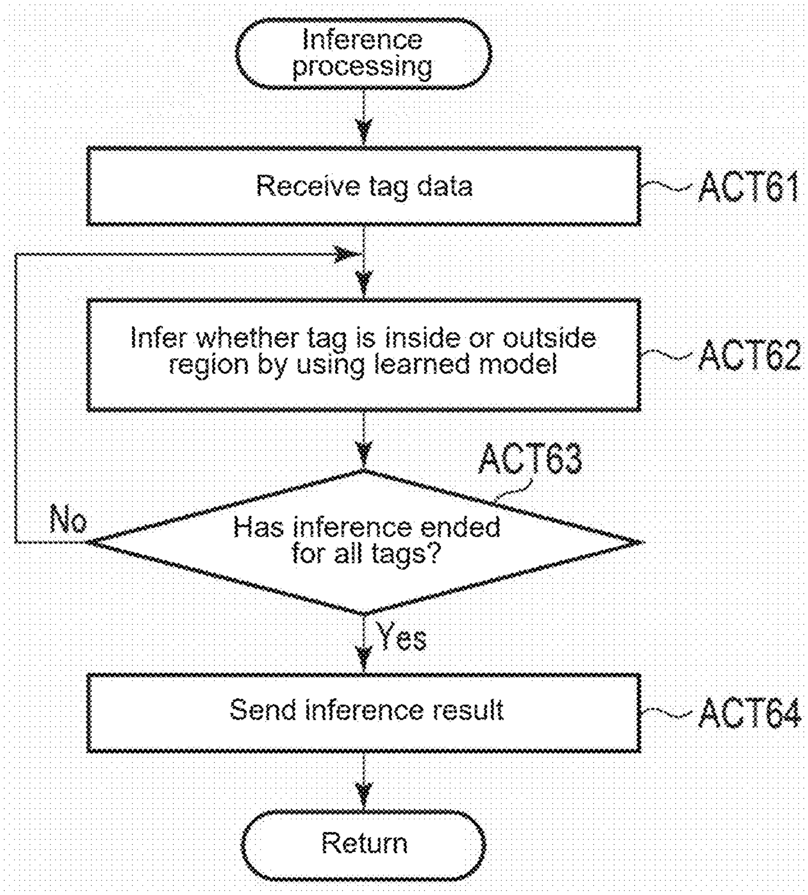
FIG. 13 is a flowchart showing an operation example of inference processing shown in FIG. 6.

Next, an operation example of the inference processing by the inference device 50 will be described with reference to FIG. 13. FIG. 13 is a flowchart showing the operation example of the inference processing by the inference device 50. This operation example is an example of inferring whether the wireless tag 90 is inside or outside the arrangement region by using a model learned by machine learning.

In ACT 61, the inference device 50 receives the tag data of the wireless tags 90 from the reading device 40.

In ACT 62, the inference device 50 infers whether each wireless tag 90 is inside or outside the arrangement region by using the model learned by machine learning on the basis of tag data at the plurality of relative positions of each received wireless tag 90.

The inference device 50 repeatedly performs the inference in ACT 62 while the inference ends for all wireless tags 90 (during the period in ACT 63).

In a case where the inference ends for all wireless tags 90 (Yes in ACT 63), the inference device 50 sends an inference result to the terminal 60 in ACT 64.

(Another Operation Example of Inference Processing)

Figure 14:
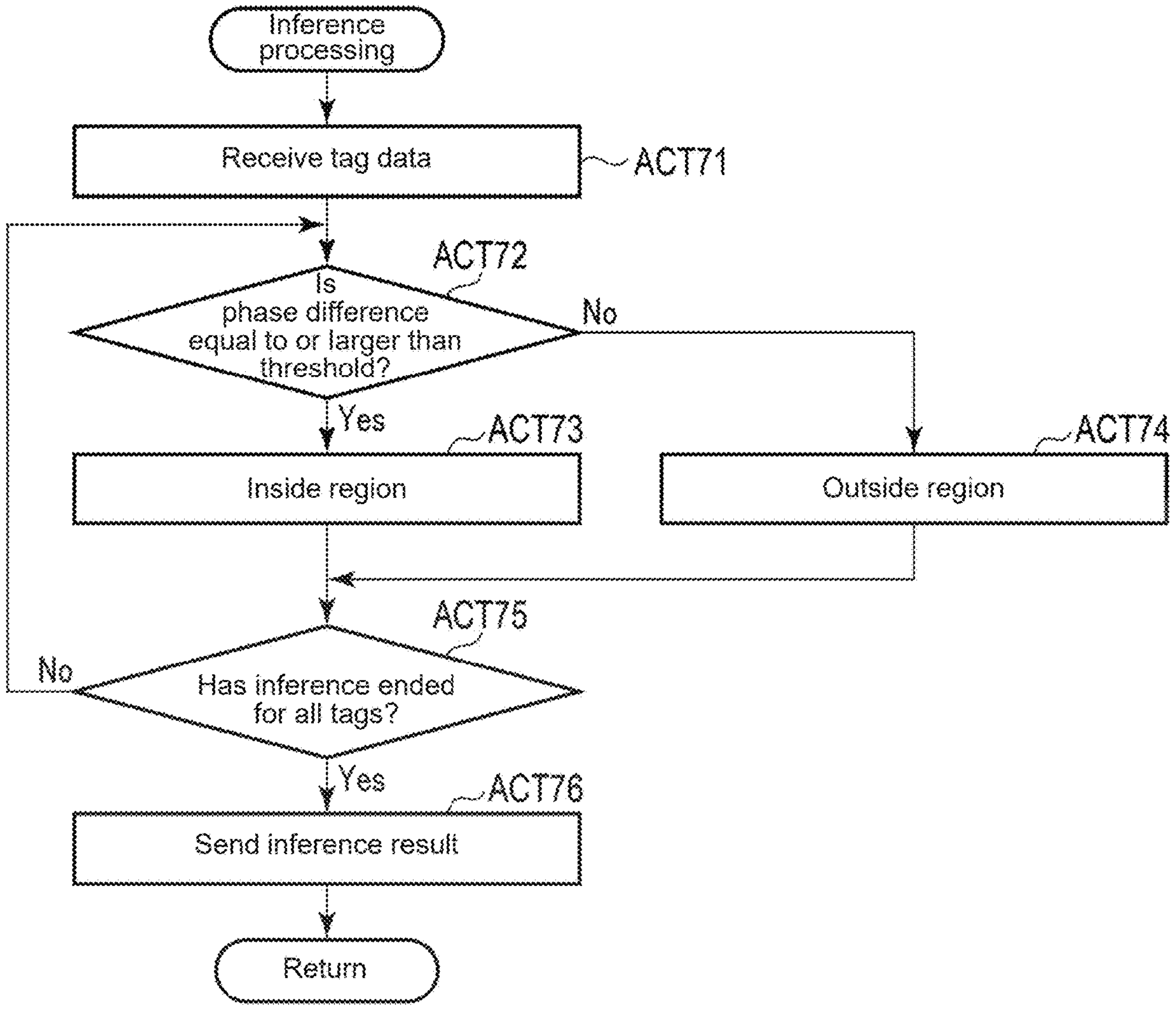
FIG. 14 is a flowchart showing another operation example of the inference processing shown in FIG. 6.

Next, another operation example of the inference processing by the inference device 50 will be described with reference to FIG. 14. FIG. 14 is a flowchart showing an operation example of the other inference processing by the inference device 50. This operation example is an example of inferring whether or not the wireless tag 90 is inside or outside the arrangement region on the basis of a phase difference in the radio waves received from the wireless tag 90.

In ACT 71, the inference device 50 receives the tag data of the wireless tags 90 from the reading device 40.

In ACT 72, the inference device 50 calculates a phase difference which is a change in phase of the tag data with respect to a relative position change at the plurality of relative positions of each received wireless tag 90 and determines whether or not the phase difference is equal to or larger than a threshold.

In a case where the phase difference is equal to or larger than the threshold (Yes in ACT 72), in ACT 73, the inference device 50 infers that the wireless tag 90 is inside the arrangement region.

On the contrary, in a case where the phase difference is smaller than the threshold (No in ACT 72), in ACT 74, the inference device 50 infers that the wireless tag 90 is outside the arrangement region.

The inference device 50 repeatedly performs the inference in ACT 72 to ACT 74 until the inference ends for all wireless tags 90 (during the period in ACT 75).

In ACT 76, in a case where the inference device 50 sends an inference result to the terminal 60, the inference ends for all wireless tags 90 (Yes in ACT 75).

(Operation Example of Terminal Processing)

As described above for example the terminal 60 reads out and displays commodity code and the like of the tag data of the wireless tag 90 inferred by the inference device 50 to be inside the arrangement region. For example, in a case where the terminal 60 is a checker terminal, the terminal 60 reads out price data and the like as well as the commodity code and performs checkout processing and the like. Moreover, in a case where the terminal 60 is a terminal for picking work, the terminal 60 performs matching processing and the like of a delivery schedule list and a shipment schedule list.

EFFECTS

In the wireless tag communication apparatus 10 according to the embodiment, the speed setting device 70 sets the change speed of the relative position of the antenna 20 with respect to the wireless tag 90 to be an appropriate speed, i.e., a speed at which a sufficient amount of data can be acquired even in a case where the number of responses of the wireless tags 90 due to anti-collision decreases before reading the wireless tag 90 by the reading device 40. Therefore, the decrease in the accuracy of inference of the arrangement region of the wireless tag due to anti-collision is prevented.

The program according to the present embodiment may be delivered in a state stored in an electronic apparatus or may be delivered in a state not stored in the electronic apparatus. In the latter case, the program may be delivered via a network or may be delivered in a state stored on a storage medium. The storage medium is a non-transitory tangible medium. The storage medium is a computer-readable medium. The storage medium can take any form as long as it is a computer-readable medium capable of storing a program, such as a CD-ROM or a memory card.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag communication apparatus, comprising:

an antenna configured to receive radio waves transmitted from a wireless tag;

a relative position change device configured to change a relative position of the antenna with respect to the wireless tag;

a reading device configured to read tag data of the wireless tag at a plurality of relative positions of the antenna with respect to the wireless tag on a basis of radio waves received by the antenna;

an inference device configured to infer an arrangement region of the wireless tag from the tag data; and a speed setting device configured to set a change speed of the relative position of the antenna with respect to the wireless tag.

2. The wireless tag communication apparatus according to claim 1, wherein the speed setting device sets, when the number of wireless tags read by the reading device is a second number larger than a first number, a change speed to be a second change speed lower in speed than a first change speed when the number of wireless tags is a first number.

3. The wireless tag communication apparatus according to claim 1, wherein the speed setting device sets a current change speed to be a change speed lower in speed than a previous change speed.

4. The wireless tag communication apparatus according to claim 1, wherein the relative position change device includes a moving mechanism that moves the antenna, the moving mechanism including a driving device, and the speed setting device controls the driving device of the moving mechanism.

5. The wireless tag communication apparatus according to claim 4, wherein the moving mechanism includes a table on which the item with the wireless tag attached is placed, and a stage that retains the antenna under the table.

6. The wireless tag communication apparatus according to claim 5, wherein the driving device linearly moves the antenna under the table by linearly moving the stage.

7. The wireless tag communication apparatus according to claim 5, wherein the driving device rotationally moves the antenna under the table by rotating the stage.

8. The wireless tag communication apparatus according to claim 7, wherein a plurality of the antennas is retained by the stage.

9. The wireless tag communication apparatus according to claim 1, wherein a plurality of the antennas is arranged, the relative position change device includes a switching device that s on/off a receiving function of the plurality of antennas, and the speed setting device controls the switching device.

10. A wireless tag communication method, comprising:

reading, on a basis of radio waves transmitted from a wireless tag and received by an antenna, tag data of the wireless tag at the plurality of relative positions of the antenna with respect to the wireless tag;

inferring the arrangement region of the wireless tag by using the tag data; and setting a change speed of the relative position of the antenna with respect to the wireless tag.

* * * * *